Figure 2:
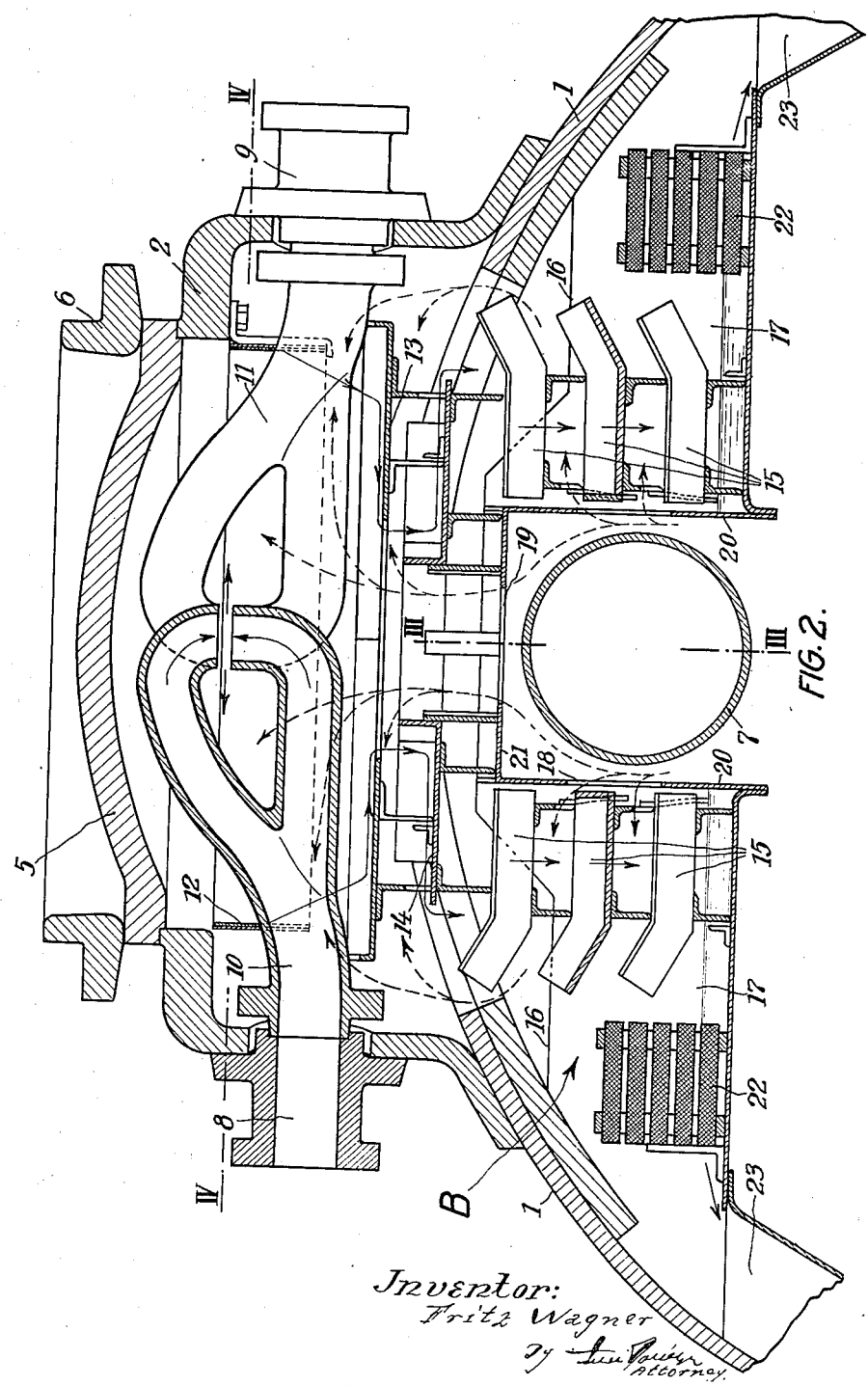

Jan. 12, 1937.  F. WAGNER  2,067,305
FEED WATER PURIFIER PLANT FOR LOCOMOTIVE BOILERS
Filed Oct. 22, 1934  3 Sheets-Sheet 1
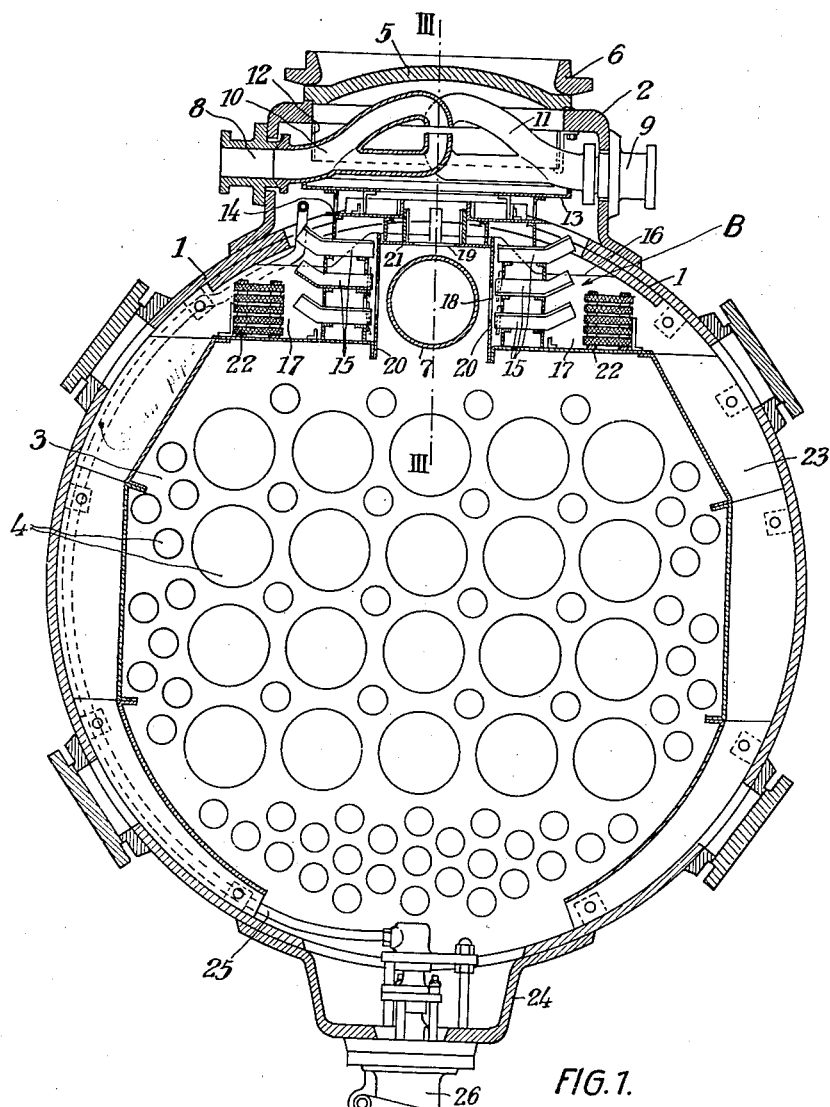
FIG. 1.
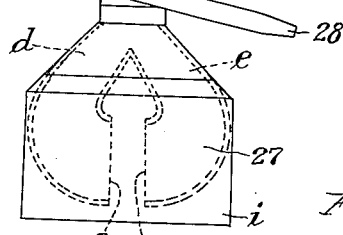
Inventor:
Fritz Wagner
By
Attorney Jan. 12, 1937.　　　　　F. WAGNER　　　　　2,067,305
FEED WATER PURIFIER PLANT FOR LOCOMOTIVE BOILERS
Filed Oct. 22, 1934　　　3 Sheets-Sheet 3

Inventor:
Fritz Wagner
By	
Attorney

Patented Jan. 12, 1937

2,067,305

UNITED STATES PATENT OFFICE 2,067,305

FEED-WATER PURIFIER PLANT FOR LOCOMOTIVE BOILERS

Fritz Wagner, Berlin-Lichterfelde, Germany

Application October 22, 1934, Serial No. 749,473

8 Claims. (Cl. 122—436)

My invention relates to a feed-water purifier plant for locomotive boilers.

It is an object of my invention to provide a plant of the type referred to whose efficiency is the maximum practically attainable and which, by the cooperation of its parts or units, prevents damage to the boiler by corrosion and scale formation.

To this end, I provide feeding means for supplying feed water to the steam space of a locomotive boiler, or to the steam space of a dome in which the plant is partly housed and which will be referred to as the "purifier dome". Below the feeding means, I arrange a baffle unit on which the solid substances precipitated from the feed water are mechanically deposited, and in combination with the feeding means and the baffle unit, I provide means for breaking up the feed water into minute particles and for heating the broken-up feed water so effectively that the solid substances are precipitated before the feed water reaches the baffle unit. In other words, the feed water is at the precipitating temperature when it reaches the baffle unit on which the precipitated matter is mechanically deposited.

Heavy surging of the water is inevitable in a locomotive boiler during its operation, and it may occur that the surging water partly washes the precipitated matter down from the baffle unit on which it is mechanically deposited. This portion of the matter collects in the water space of the boiler as mud, and must be removed.

The various parts of my plant thus cooperate for:

Breaking up and finely dividing the feed water admitted to the steam space of the boiler, or of the purifier dome, if any;

Suitably conducting the steam by which the broken-up feed water is heated for precipitating the solid substances dissolved therein;

Abducting gases dissolved in, and liberated from, the feed water;

Mechanically depositing the precipitated matter above the water level of the boiler.

The problem of protecting locomotive boilers, with or without a purifier dome, from damage by corrosion and scale, was not solved satisfactorily by purifier plants as designed heretofore but is solved by the maximum efficiency of my novel plant.

In the accompanying drawings, a plant embodying my invention is illustrated by way of example, as adapted to a locomotive boiler with a purifier dome, but it is understood that I am not limited to this but that my plant may be arranged in the steam space of a boiler without a purifier dome.

Figure 3:
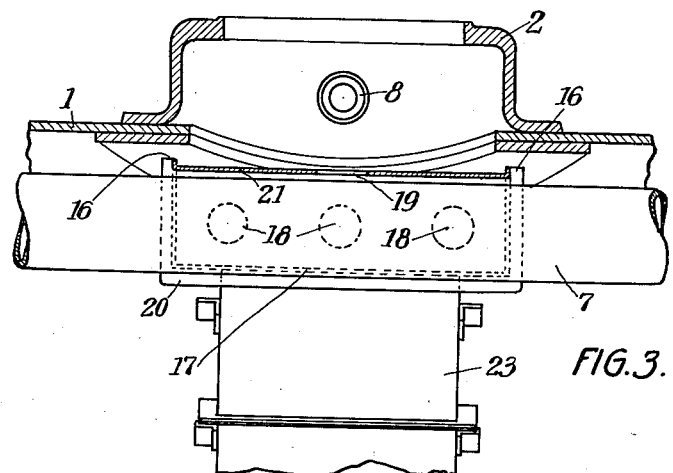
Figure 4:
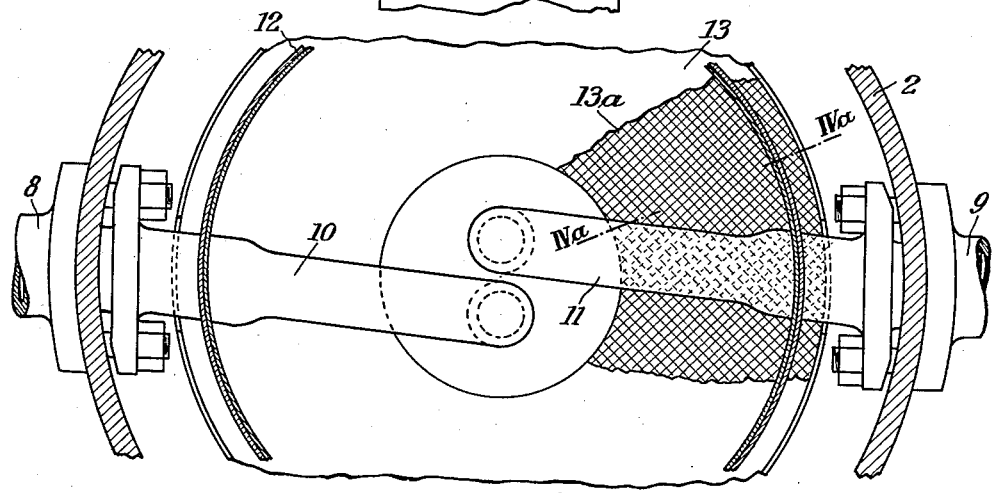
Figure 4A:
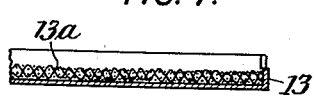

In the drawings:

Fig. 1 is a section of the boiler showing the complete plant and taken transversely to the axis of the boiler and in the axial plane of the purifier dome, viewed from the rear, Fig. 2 shows the upper portion of Fig. 1, drawn to a larger scale, Fig. 3 is a section on the line III—III in Fig. 1, Fig. 4 is a section on the line IV—IV in Fig. 2, and Fig. 4a is a section on the line IVa—IVa in Fig. 4.

Referring now to the drawings, 1 is the barrel of the boiler, 2 is the purifier dome, and 3 is the front tube plate, with the usual holes 3 for the tubes and superheater flues which have not been shown. The purifier dome 2 is closed by a cover 5, a holding-down ring 6 and suitable screws, not shown. 7 is the live-steam pipe.

Feed-pipe connections 8 and 9 are secured to opposite sides of the purifier dome 2 and connected, at their outer ends, to the delivery pipes of suitable feed pumps, not shown. Connected to the inner ends of the connections 8 and 9 are discharge nozzles 10 and 11, respectively. The discharge nozzles 10 and 11 are forked and their outlet openings extend transversely to the axis of the axially aligned fork parts, or to the axis of the purifier dome 2. The feed water flows from the two openings of the outlet ends in two axially aligned and oppositely directed jets which encounter and spread out like a veil. The veil is intercepted and deflected by a vertical annular baffle 12 in the purifier dome 2. The flow of the water is indicated by arrows in full lines, and the flow of the steam tornado rushing into the zone of reduced pressure, is indicated by arrows in dotted lines, in Fig. 2.

Members 13, 14 and 15 make up the baffle unit which is generally designated by the letter "B". 13 is an upper, and 14 is a lower horizontal plate in the baffle unit B. The upper plate 13 is flanged at its rim and has a central hole, while the lower plate 14 has a plain rim and a flanged central hole. The plates are mounted on angle sections, and below them is arranged a pile of angle-section trays 15 which are so positioned as to present their open spaces to the descending water. The water, after flowing through the baffle unit B and depositing the major part of the precipitated solid matter on the faces presented by the unit, collects on the bottom of a tray 17, of channel section in which the baffle unit B is mounted. The tray has side walls whose upper edge is designated by the numeral "16", as best seen in Fig. 3. A pair of parallel vertical walls 20 extending transversely to the side walls of the tray 17, and a horizontal wall 21, make up a saddle with which the tray straddles the live-steam pipe 7, as best seen in Fig. 2. The walls 20 and 21 have openings 18 and 19, respectively. Filters 22 are mounted on the bottom of the tray 17 at opposite sides of the baffle unit, and 23 are conduits of channel section which are connected to both sides of the tray 17 and secured to the barrel 1 of the boiler. The conduits 23 are arranged symmetrically and extend almost as far as the bottom of the barrel 1, as best seen in Fig. 1. A mud collector 24 is secured to the bottom of the barrel 1 between the lower ends of conduits 23, and 26 is the outflow pipe of a blow-off valve in the mud collector 24. The blow-off valve is connected to the purifier dome 2 by a steam pipe 25. The blow-off valve will not be described as its design is not a part of my invention. The forked pressure-reducing device 27 is connected to the lower end of outlet pipe 26.

All, or any one, of the surfaces over which water flows, including the annular baffle 12, may be lined with wire netting, preferably with superimposed wire screens 13a, as shown for the upper plate 13 of the baffle unit B in Fig. 4a.

It is known that the feed water which the feed pumps deliver into the steam space of a purifier dome, immediately produces here a zone of reduced pressure by the condensation of the steam. The steam from the dome and the boiler rushes into the zone and heats in counter current the water descending toward the baffle unit. If the quantities of steam condensed by the feed water in this manner, are large, the velocity of the steam flowing against the descending water becomes that of a tornado. This tornado breaks up the water descending through it into minute water particles which it whirls about, and heats the water almost instantaneously to a temperature at which the gases dissolved in the water are liberated, and the solid substances dissolved therein are precipitated, before the descending water has attained the baffle unit below.

The liberated gases are thrown into the steam space of the boiler by the counterflowing steam and flow to the locomotive engine with the steam, without doing any harm. The solid matter, however, must be separated or precipitated before it reaches the baffle unit, as otherwise the matter gets into the boiler with the feed water and there causes the well-known scale trouble.

In order to avoid this, it is indispensable that the said tornado of steam should be produced immediately the feeding operation is performed, because then the solid substances are precipitated in time and practically all of them are deposited in the baffle unit.

Such a tornado cannot be produced by feeding means as designed heretofore. Such means nearly always subdivide the water only into thick jets which descend in the steam space of the purifier dome almost parallel to the axis of the dome, and finally reach the baffle unit below. Such thick jets obviously present only small areas for contact with the steam, and, as they descend almost vertically, the time available for the contact is very short. Only small quantities of steam are condensed and the counterflow of steam resulting from such poor condensation is quite unable to break up the water into minute particles. Therefore, the water is heated only moderately when it reaches the baffle unit and the heating in the baffle unit itself is also slow because the cascades forming in the unit are heated practically from one side only, on account of insufficient supply of steam from the boiler. In the old purifiers, consequently, only a portion of the solid substances was precipitated and deposited in the baffle unit, while the other portion was precipitated and deposited in the boiler, and not in the unit.

This difficulty was a serious one because, with the then state of the art, it was not possible to discharge a considerable percentage of this portion by blowing off under pressure. If it had been feasible to blow off under pressure by abruptly and fully opening the blow-off valve, huge quantities of mud could have been discharged by keeping open the mud valve for periods of three to five seconds, while the loss of hot water would have been very small. However, blowing off under pressure was impossible on account of the risk it involved for the crew, and so the mud was removed after the boiler had become pressureless. When this has occured, however, the mud sticks to the boiler so firmly that only a small portion of the mud is discharged, while, on the other hand, a very large quantity of valuable hot water is wasted.

Scale deposits in the old feeding devices were therefore very considerable.

In the plant according to my invention, on the other hand, the solid substances are precipitated before the water reaches the baffle unit B and the small quantity of mud which surges wash off the baffle unit and which collects in the boiler, is disposed of by blowing off under pressure.

The deposition of the separated solid substances begins at the topmost plate 13 of the baffle unit and is finished only when the water flows from the baffle unit into the water space of the boiler through conduits 23. The long way available for the deposition of the substances effects a more thorough deposition which is also favored by improved means for conducting the steam from the boiler.

Formerly, stepped and superimposed baffle units were positioned in a tray whose bottom was solid. Steam from the boiler could not get to the purifier dome except through the clearance between the edge of the tray and the boiler barrel, and therefore, in the purifier dome, the steam did not get into such intimate contact with the cascades flowing down from every dripping edge of the baffle unit, that it could break up the cascades and whirl about the water particles. The cascades, therefore, fell from one step to the next without being subdivided.

In my plant, the baffle unit B is housed in the tray 17 which, as described, straddles the live-steam pipe 7 with its walls 20 and 21. These walls being provided with the large openings 18 and 19, the steam rushes not only through the spaces between the edges 16 of the tray and the boiler barrel, as in the old devices, but also through the openings 18 and 19 and the central openings in the plates 13 and 14 of the baffle unit B. In this manner, it flows rapidly through the baffle unit, breaks up the cascades and hurls the water particles against all faces which the unit presents. Particles, however, adhere longer to the faces than flowing water—which is very important with respect to the deposition of the solid substances—and, besides, flowing water only gets into contact with the faces it flows over.

The filters 22 in the tray 17 at opposite sides of the baffle unit intercept those solid substances which have not been deposited in the baffle unit. The water flows through the filters to get into the conduits 23 which conduct it to the water space of the boiler.

Small quantities of solid substances, as mentioned, may be washed into the water space of the boiler by heavy surges. These, however, are removed for the major part by opening abruptly and fully the blow-off valve several times a day while the boiler is under pressure.

Obviously, such blow-off valves must be controlled from the cab by steam or compressed air, and a lever 28 as shown in Fig. 1, may be connected to the control for operating the blow-off valve.

I claim:

1. A feed-water purifier plant for locomotive boilers, comprising a feed pipe, a nozzle on the inner end of the feed pipe and in the steam space of the boiler and having forked means forming part of the nozzle for breaking up into a veil directed transversely to the axis of the nozzle, the water issuing from the nozzle outlet, and a baffle unit arranged below, and spaced from, the nozzle outlet, said forked means ending in outlets which are so positioned as to direct the veil of water in a substantially horizontal plane.

2. A feed-water purifier plant for locomotive boilers, comprising a purifier dome on a locomotive boiler, a feed pipe connected to the dome, a nozzle on the inner end of the feed pipe and in the steam space of the dome; means forming part of the nozzle for breaking up into a veil directed transversely to the axis of the nozzle, the water issuing from the nozzle outlet, and a baffle unit arranged below, and spaced from, the nozzle outlet, said forked means ending in outlets which are so positioned as to direct the veil of water in a substantially horizontal plane.

3. A feed-water purifier plant for locomotive boilers, comprising a feed pipe, a nozzle on the inner end of the feed pipe and in the steam space of the boiler and having forked means forming part of the nozzle for breaking up into a veil directed transversely to the axis of the nozzle, the water issuing from the nozzle outlet, a baffle unit arranged below, and spaced from, the nozzle outlet, and wire netting on not less than one of the faces of the plant with which feed water gets into contact, said forked means ending in outlets which are so positioned as to direct the veil of water in a substantially horizontal plane.

4. A feed-water purifier plant for locomotive boilers, comprising a feed pipe, a nozzle on the inner end of the feed pipe and in the steam space of the boiler and having forked means forming part of the nozzle for breaking up into a veil directed transversely to the axis of the nozzle, the water issuing from the nozzle outlet, an annular baffle surrounding the outlet in spaced relation, and a baffle unit arranged below, and spaced from, the nozzle outlet, said forked means ending in outlets which are so positioned as to direct the veil of water in a substantially horizontal plane.

5. A feed-water purifier plant for locomotive boilers, comprising a feed pipe, a nozzle on the inner end of the feed pipe and in the steam space of the boiler and having forked means forming part of the nozzle for breaking up into a veil directed transversely to the axis of the nozzle, the water issuing from the nozzle outlet, and a baffle unit arranged below, and spaced from, the nozzle outlet and including stepped baffles and a tray straddling the live steam pipe of the boiler, said forked means ending in outlets which are so positioned as to direct the veil of water in a substantially horizontal plane.

6. A feed-water purifier plant for locomotive boilers, comprising a feed pipe, a nozzle on the inner end of the feed pipe and in the steam space of the boiler and having forked means forming part of the nozzle for breaking up into a veil directed transversely to the axis of the nozzle, the water issuing from the nozzle outlet, and a baffle unit arranged below, and spaced from, the nozzle outlet and including superimposed plates, inverted angle sections, and a tray straddling the live-steam pipe of the boiler, said forked means ending in outlets which are so positioned as to direct the veil of water in a substantially horizontal plane.

7. A feed-water purifier plant for locomotive boilers, comprising a feed pipe, a nozzle on the inner end of the feed pipe and in the steam space of the boiler and having forked means forming part of the nozzle for breaking up into a veil directed transversely to the axis of the nozzle, the water issuing from the nozzle outlet, and a baffle unit arranged below, and spaced from, the nozzle outlet and including superimposed plates as the baffles, and a tray straddling the live-steam pipe of the boiler and having openings for the steam in its straddling portion, said forked means ending in outlets which are so positioned as to direct the veil of water in a substantially horizontal plane.

8. A feed-water purifier plant for locomotive boilers, comprising a feed pipe, a nozzle on the inner end of the feed pipe and in the steam space of the boiler and having forked means forming part of the nozzle for breaking up into a veil directed transversely to the axis of the nozzle, the water issuing from the nozzle outlet, a baffle unit arranged below, and spaced from, the nozzle outlet and including a tray straddling the live-steam pipe of the boiler, a conduit connected to the tray for conducting the feed water to the bottom of the boiler, and a filter arranged between the tray and the conduit, said forked means ending in outlets which are so positioned as to direct the veil of water in a substantially horizontal plane.

FRITZ WAGNER.